United States Patent
Larkin et al.

(10) Patent No.: US 9,657,786 B2
(45) Date of Patent: May 23, 2017

(54) TORQUE TRANSFER MECHANISM WITH SEALED BALL-RAMP CLUTCH OPERATOR UNIT

(71) Applicant: Magna Powertrain of America, Inc., Troy, MI (US)

(72) Inventors: Bradley Larkin, Shelby Township, MI (US); Joseph Mueller, Clarkston, MI (US)

(73) Assignee: MAGNA POWERTRAIN OF AMERICA, INC., Troy, MI (US)

( * ) Notice: Subject to any disclaimer, the term of this patent is extended or adjusted under 35 U.S.C. 154(b) by 32 days.

(21) Appl. No.: 14/547,232

(22) Filed: Nov. 19, 2014

(65) Prior Publication Data

US 2015/0144453 A1 May 28, 2015

Related U.S. Application Data

(60) Provisional application No. 61/908,882, filed on Nov. 26, 2013.

(51) Int. Cl.
| | |
|---|---|
| *F16D 27/14* | (2006.01) |
| *F16D 23/12* | (2006.01) |
| *F16D 27/115* | (2006.01) |
| *F16D 28/00* | (2006.01) |
| *B60K 17/35* | (2006.01) |
| *F16H 48/42* | (2012.01) |
| *B60K 23/08* | (2006.01) |

(52) U.S. Cl.
CPC .............. *F16D 27/14* (2013.01); *B60K 17/35* (2013.01); *B60K 23/0808* (2013.01); *F16D 23/12* (2013.01); *F16D 27/115* (2013.01); *F16D 28/00* (2013.01); *B60K 2023/0833* (2013.01); *B60K 2023/0858* (2013.01); *F16D 2023/123* (2013.01); *F16D 2300/08* (2013.01); *F16H 48/42* (2013.01)

(58) Field of Classification Search
CPC . F16H 37/124; F16H 37/25125; F16J 15/525; F16J 15/545; F16J 15/3236; F16D 2300/08; F16D 23/08; F16D 2023/123
USPC ..................... 192/84.7, 93 R, 93 A
See application file for complete search history.

(56) References Cited

U.S. PATENT DOCUMENTS 2,230,471 A * 2/1941 Stein ........................ F16C 19/10
                                                          384/477
3,877,558 A * 4/1975 Endo ....................... F16D 23/148
                                                          192/110 B (Continued)

*Primary Examiner* — Stacey Fluhart
(74) *Attorney, Agent, or Firm* — Dickinson Wright PLLC

(57) ABSTRACT

A torque transfer mechanism is provided for controlling the magnitude of a clutch engagement force exerted on a multi-plate clutch assembly that is operably disposed between a first rotary and a second rotary member. The torque transfer mechanism includes a power-operated clutch actuator for generating and applying a clutch engagement force on the clutch assembly. Clutch actuator assembly includes a clutch apply operator for controlling the magnitude of a clutch engagement force applied to the clutch assembly. The clutch operator includes a first and second cam plate that are spaced form in one another to define a cavity therebetween. A sealing element extends between the first and second cam plates to seal the cavity between the first and second cam plates for retaining fluids in the cavity.

22 Claims, 12 Drawing Sheets

(56) References Cited

U.S. PATENT DOCUMENTS

| | | | | |
|---|---|---|---|---|
| 4,057,134 | A * | 11/1977 | Gatewood | F16D 13/755 192/111.14 |
| 4,142,616 | A * | 3/1979 | Dekoninck | F16D 43/206 192/56.54 |
| 4,204,720 | A * | 5/1980 | Otani | F16D 23/12 192/98 |
| 4,293,060 | A * | 10/1981 | Miller | F16D 27/118 192/150 |
| 4,319,672 | A * | 3/1982 | Barthelemy | B62D 5/00 192/56.2 |
| 4,878,567 | A * | 11/1989 | Buckley | B60K 23/04 192/111.1 |
| 6,675,943 | B2 | 1/2004 | Organek et al. | |
| 7,111,716 | B2 * | 9/2006 | Ekonen | B60K 23/0808 180/249 |
| 7,527,133 | B2 | 5/2009 | Sachsenmaier et al. | |
| 7,686,149 | B2 | 3/2010 | Sachsenmaier et al. | |
| 7,699,740 | B2 * | 4/2010 | Gassmann | F16D 13/52 192/93 A |
| 8,235,183 | B2 | 8/2012 | Dennis et al. | |
| 8,479,904 | B2 | 7/2013 | Krieberneg et al. | |
| 2003/0079955 | A1 * | 5/2003 | Kim | B60K 17/35 192/84.6 |
| 2007/0095628 | A1 | 5/2007 | Niederbacher | |
| 2010/0089199 | A1 * | 4/2010 | Lafer | F16D 28/00 74/665 F |
| 2012/0263406 | A1 * | 10/2012 | Arnault | F16D 23/14 384/484 |

* cited by examiner

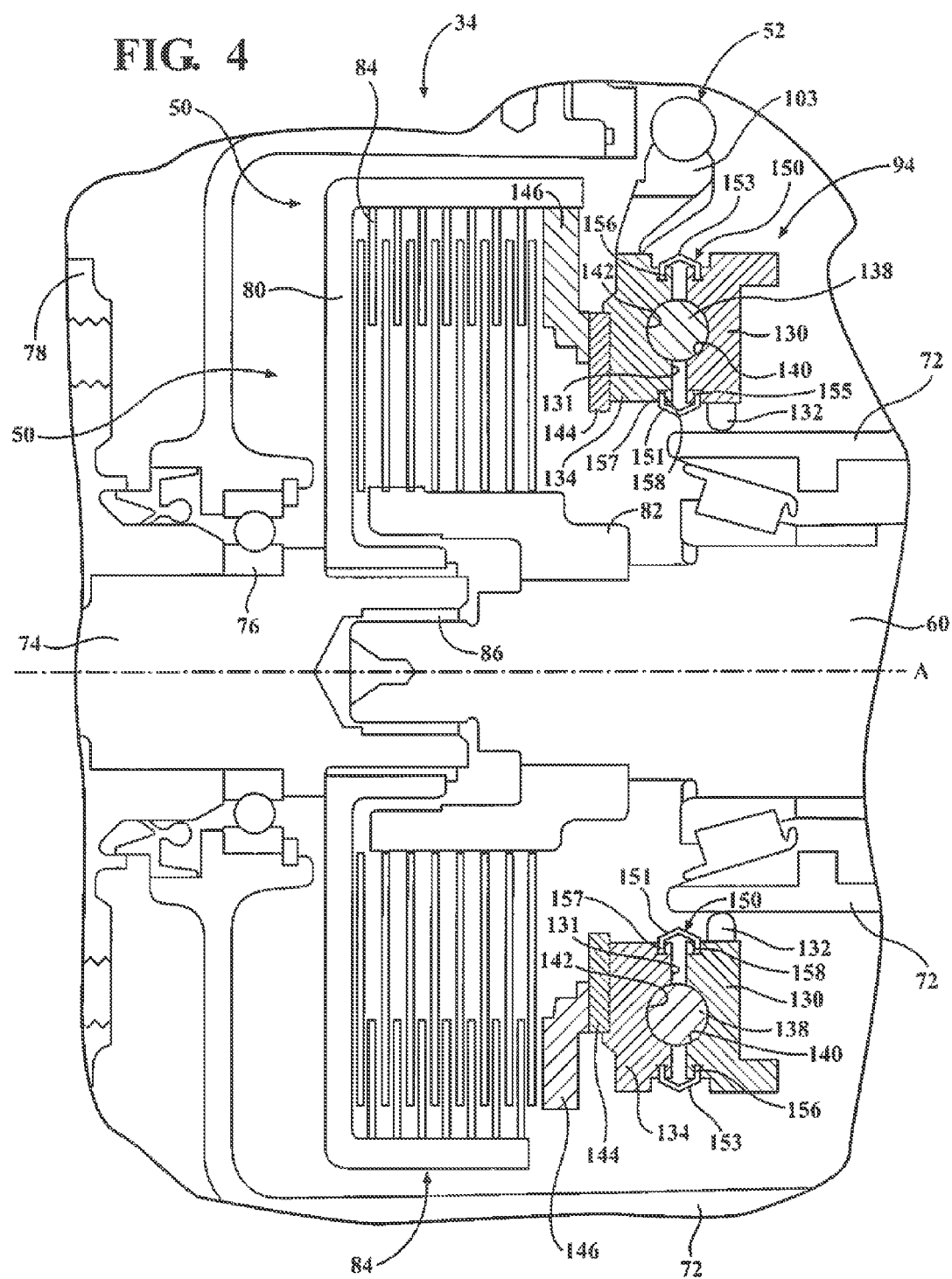

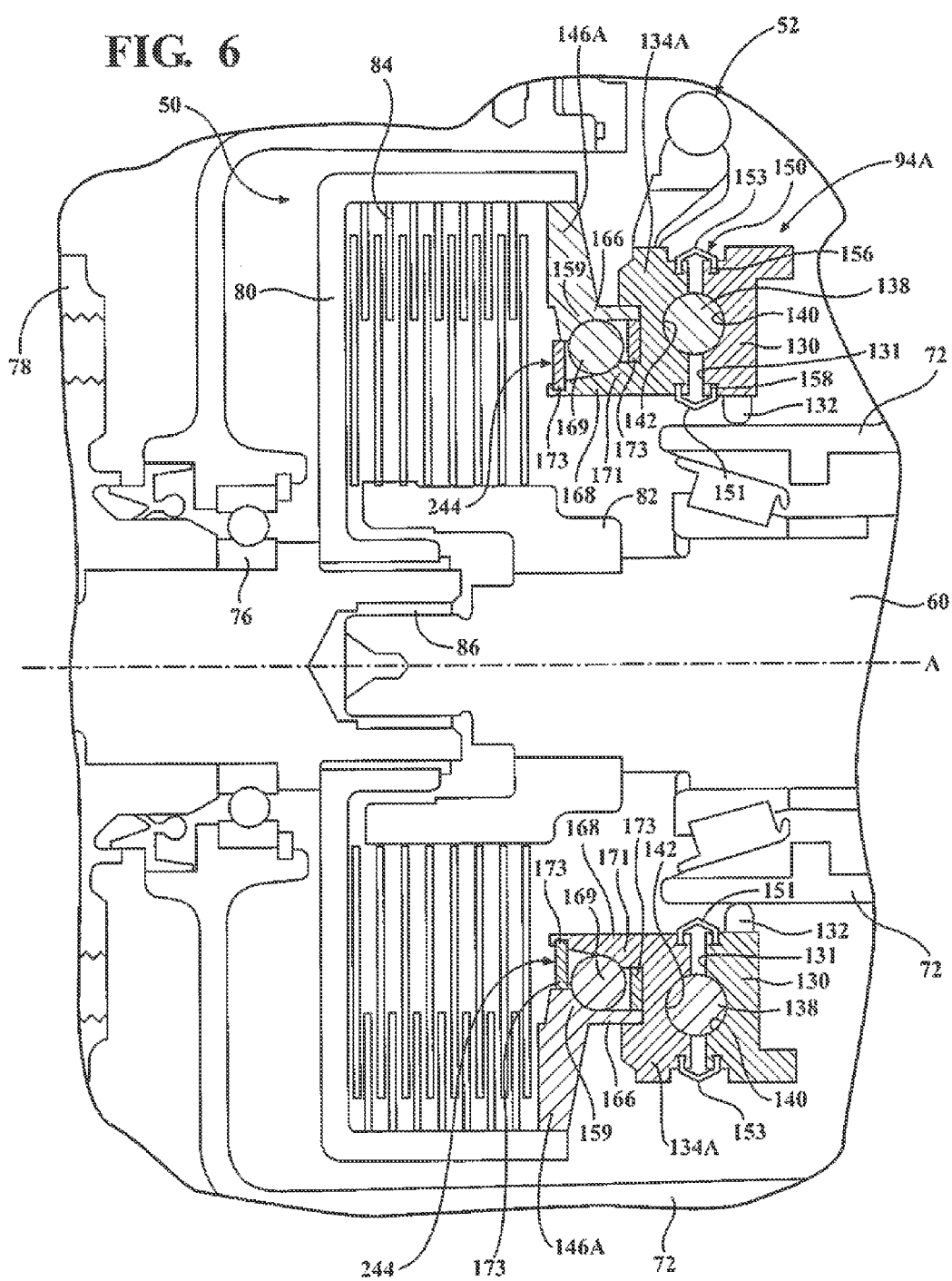

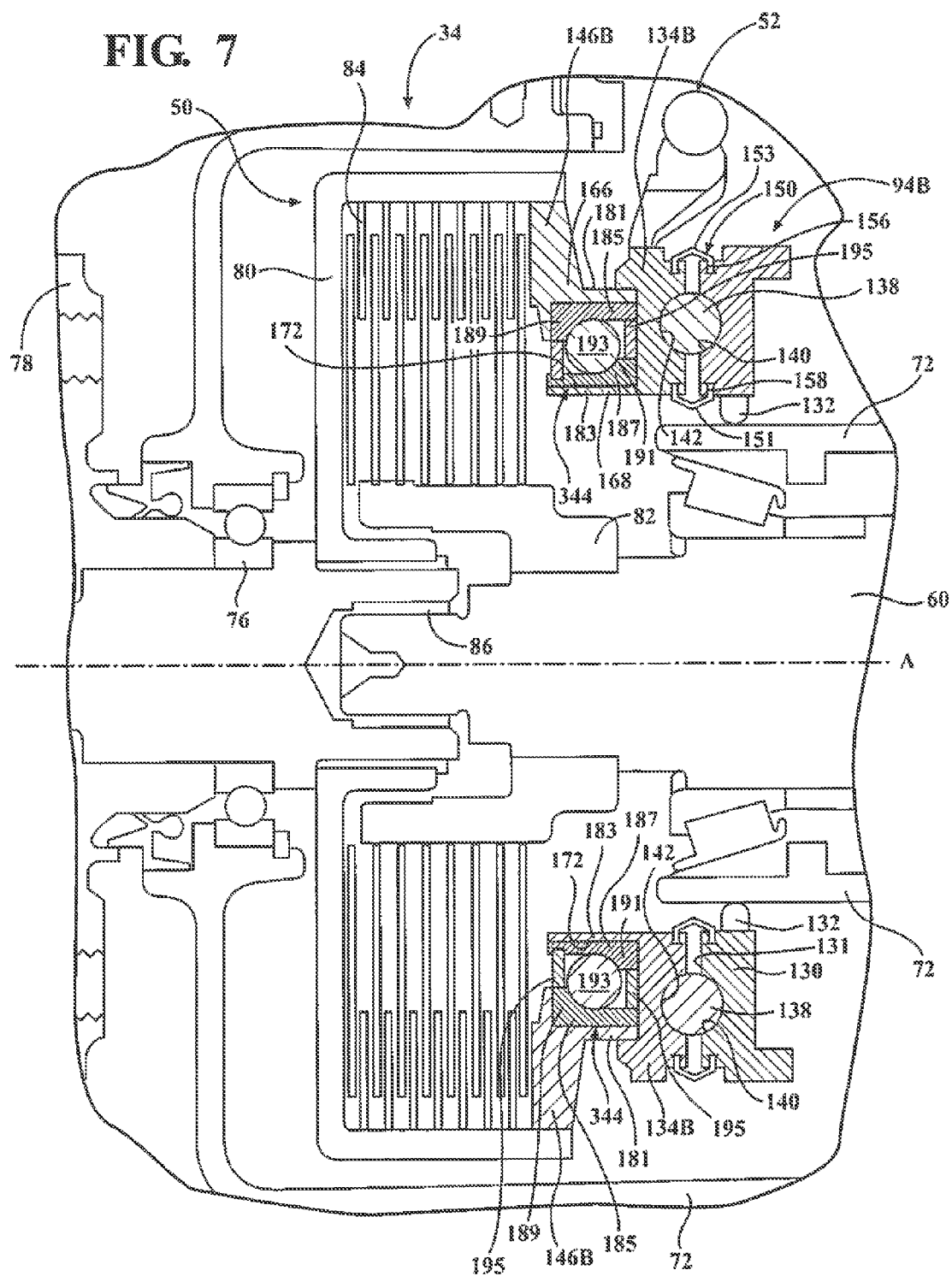

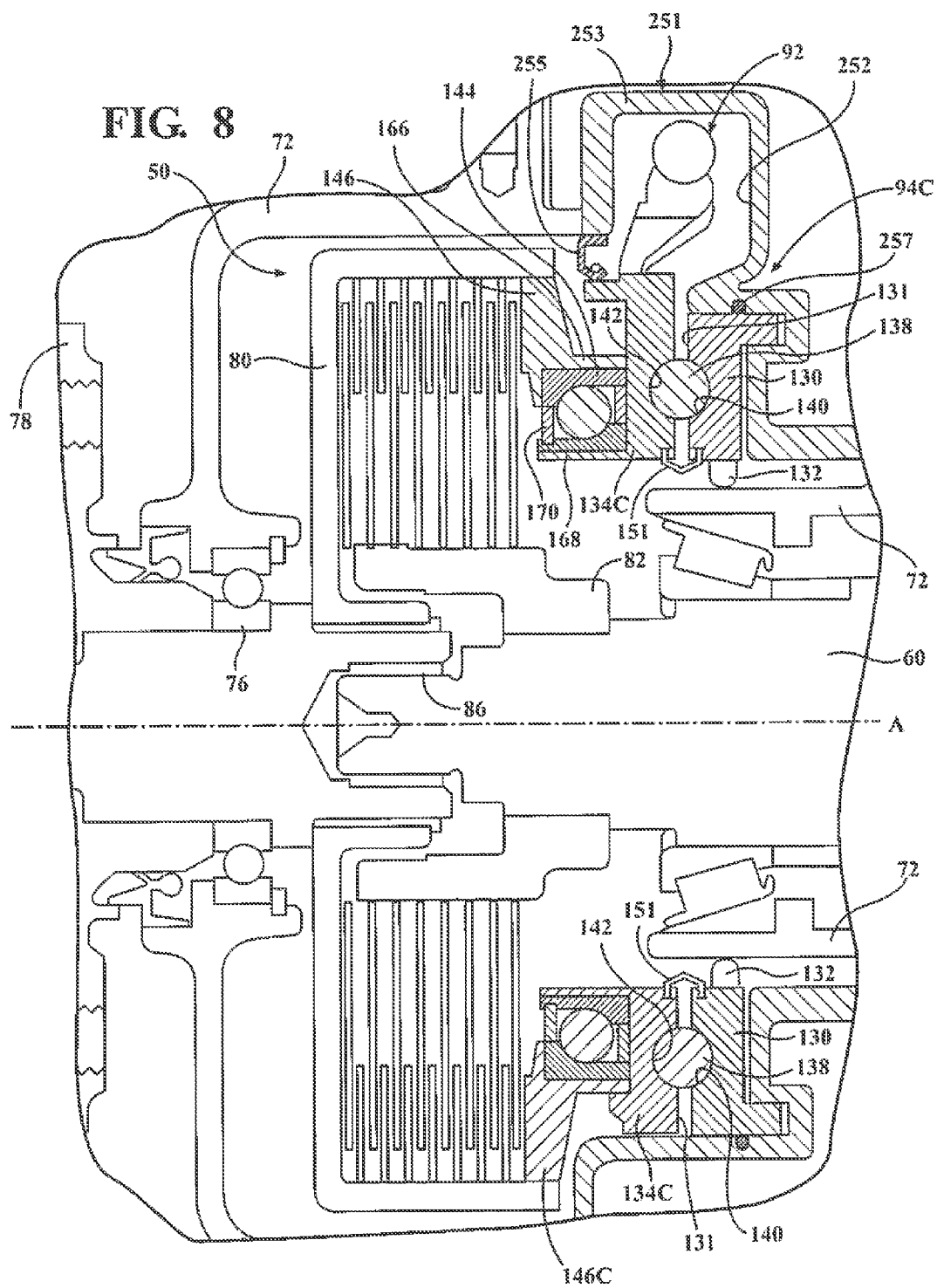

TORQUE TRANSFER MECHANISM WITH SEALED BALL-RAMP CLUTCH OPERATOR UNIT

CROSS REFERENCE TO RELATED APPLICATION

This application claims priority to and the benefit of U.S. Provisional Patent Application Ser. No. 61/908,882 filed Nov. 26, 2013, entitled "ELECTROMECHANICAL BALL RAMP ACTUATION FOR DRY TRANSFER CASE". The entire disclosure of the above application is incorporated herein by reference.

BACKGROUND

1. Field of the Invention

The present disclosure relates generally to power transfer systems for controlling the distribution of drive torque between the front and rear drivelines of a four-wheel drive vehicle and/or the left and right wheels of an axle assembly. More particularly, the present disclosure is directed to a power transmission device for use in motor vehicle driveline applications having a torque transfer mechanism equipped with a power-operated clutch actuator that is operable for controlling actuation of a multi-plate friction clutch assembly.

2. Related Art

This section provides background information related to the present disclosure which is not necessarily prior art.

In view of increased demand for four-wheel drive and all-wheel drive vehicles, a plethora of power transfer systems have been developed for incorporation into vehicular driveline applications for transferring drive torque to the wheels. In many vehicles, a power transmission device is operably installed between the primary and secondary drivelines. Such power transmission devices are typically equipped with a torque transfer mechanism which is operable for selectively and/or automatically transferring drive torque from the primary driveline to the secondary driveline to establish a four-wheel drive or all-wheel drive mode of operation.

A modern trend in four-wheel drive motor and all-wheel drive vehicles is to equip the power transmission device with a transfer clutch and an electronically-controlled traction control system. The transfer clutch is typically operable for automatically directing drive torque to the secondary wheels, without any input or action on the part of the vehicle operator, when traction is lost at the primary wheels for establishing an "on-demand" four-wheel drive mode. Typically, the transfer clutch includes a multi-plate clutch assembly that is installed between the primary and secondary drivelines and a clutch actuator for generating a clutch engagement force that is applied to the multi-plate clutch assembly. The clutch actuator typically includes a power-operated device that is actuated in response to electric control signals sent from an electronic controller unit (ECU). Variable control of the electric control signal is frequently based on changes in one or more of the the current operating characteristics of the vehicle (i.e., vehicle speed, interaxle speed difference, acceleration, steering angle, etc.) as detected by various sensors. Thus, such "on-demand" power transmission devices can utilize adaptive control schemes for automatically controlling torque distribution during all types of driving and road conditions.

A large number of on-demand power transmission systems have been developed which utilize an electrically-controlled clutch actuator for regulating the amount of drive torque transferred through the clutch assembly to the secondary driveline as a function of the value of the electrical control signal applied thereto. In some applications, the transfer clutch employs an electromagnetic clutch as the power-operated clutch actuator. For example, U.S. Pat. No. 5,407,024 discloses an electromagnetic coil that is incrementally activated to control movement of a ball-ramp drive assembly for applying a clutch engagement force on the multi-plate clutch assembly. Likewise, Japanese Laid-open Patent Application No. 62-18117 discloses a transfer clutch equipped with an electromagnetic clutch actuator for directly controlling actuation of the multi-plate clutch pack assembly.

As an alternative, the transfer clutch may employ an electric motor and a drive assembly as the power-operated clutch actuator. For example, U.S. Pat. No. 5,323,871 discloses an on-demand transfer case having a transfer clutch equipped with an electric motor that controls rotation of a sector plate which, in turn, controls pivotal movement of a lever arm for applying the clutch engagement force to the multi-plate clutch assembly. Moreover, Japanese Laid-open Patent Application No. 63-66927 discloses a transfer clutch which uses an electric motor to rotate one cam plate of a ball-ramp operator for engaging the multi-plate clutch assembly. U.S. Pat. No. 4,895,236 discloses a transfer case equipped with a transfer clutch having an electric motor driving a reduction gearset for controlling movement of a ball screw operator which, in turn, applies the clutch engagement force to the clutch pack. Additionally, U.S. Pat. No. 5,423,235 discloses a transfer case equipped with an electric motor driven gearset arranged to rotate a first cam member of a hall-ramp operator for causing axial translation of a second cam member configured to apply the clutch engagement force on the clutch pack. Finally, U.S. Pat. Nos. 7,527,133 and 8,479,904 disclose transfer cases equipped with an electric motor driven gearset arranged to both rotate and axially translate a single cam member of a ball-ramp operator.

While many on-demand clutch control systems similar to those described above are currently used in four-wheel drive and all-wheel drive vehicles, a need exists to advance the technology and address recognized system limitations. For example, the size and weight of the friction clutch components and the electrical power and actuation time requirements for the clutch actuator that are needed to provide the large clutch engagement loads may make such system cost prohibitive in some motor vehicle applications. In an effort to address these concerns, new technologies are being considered for use in power-operated clutch actuator applications.

SUMMARY

This section provides a general summary of the present disclosure and is not a comprehensive disclosure of its full scope or all of its features, aspects and objectives.

It is therefore an aspect of the present disclosure to provide a power transmission device for use in a motor vehicle having a torque transfer mechanism equipped with a power-operated clutch actuator that is operable to control engagement of a multi-plate clutch assembly.

It is another aspect of the present disclosure to provide a torque transfer mechanism that is well-suited for use in motor vehicle driveline applications to control the transfer of drive torque between a first rotary member and a second rotary member.

It is another aspect of the present disclosure to provide a torque transfer mechanism that allows for dry operation of a clutch actuator assembly.

It is another aspect of the present disclosure to provide a torque transfer mechanism that accommodates high shaft speeds and loads.

Based on these and other aspects and objectives of the present disclosure, a power transmission device is provided. The power transmission device comprises a rotary input member adapted to receive drive torque from a power source as well as a rotary output member extending along an axis adapted to provide drive torque to an output device. A torque transfer mechanism is operable for transferring drive torque from the input member to the output member. The torque transfer mechanism includes a clutch assembly operably disposed between the input member and the output member, and a clutch actuator assembly for applying a clutch engagement force to the clutch assembly. The clutch actuator assembly includes an electric motor driving a geared drive unit for controlling the clutch engagement force applied to the clutch assembly by a clutch apply operator. The clutch apply operator is a "sealed" ball-ramp unit which includes a first cam plate and a second cam plate driven by the geared drive unit. The second cam plate is axially spaced from the first cam plate to define a cavity between the first and second cam plates. The first cam plate defines a plurality of first cam recesses and the second cam plate defines a plurality of second cam recesses. The clutch apply operator further includes a plurality of rollers, each disposed between one of the first cam recesses and one of the second cam recesses in the cavity. At least one of the first and second cam recesses is tapered for causing axial movement of the second cam plate relative to the first cam plate during rotation of the second cam plate. The clutch apply operator also includes a sealing arrangement extending between the first and second cam plates to seal the cavity between the first and second cam plates for retaining lubricant in the cavity.

BRIEF DESCRIPTION OF THE DRAWINGS

These and other features and aspects of the present disclosure will become more readily appreciated when considered in connection with the following detailed description and appended drawings, wherein:

FIG. 4 is an enlarged view of the power transmission device shown FIG. 3;

FIG. 6 is a schematic illustration of a power transmission device constructed in accordance with another aspect of the present disclosure;

FIG. 7 is a schematic illustration of a power transmission device constructed in accordance with yet another aspect of the present disclosure;

FIG. 8 is a schematic illustration of a power transmission device constructed in accordance with a further aspect of the present disclosure;

DETAILED DESCRIPTION OF THE ENABLING EMBODIMENTS

In general, at least one example embodiment of a power transmission device equipped with a torque transfer mechanism constructed in accordance with the teachings of the present disclosure will now be disclosed. The following example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. However, it will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are described in detail.

The present disclosure is directed to a torque transfer mechanism that can be adaptively controlled for modulating the torque transferred between a first rotary member and a second rotary member. The torque transfer mechanism includes a friction clutch and a "sealed" ball-ramp clutch operator unit. The torque transfer mechanism finds particular application in power transmission devices for use in motor vehicle drivelines such as for example, an on-demand transfer clutch in a transfer case, an in-line torque coupling in a power take-off unit, or a biasing clutch associated with a differential unit in a drive axle assembly. Thus, while the present disclosure is hereinafter described in association with particular arrangements for use in specific driveline applications, it will be understood that the arrangements shown and described are merely intended to illustrate aspects of the present disclosure.

Figure 1:
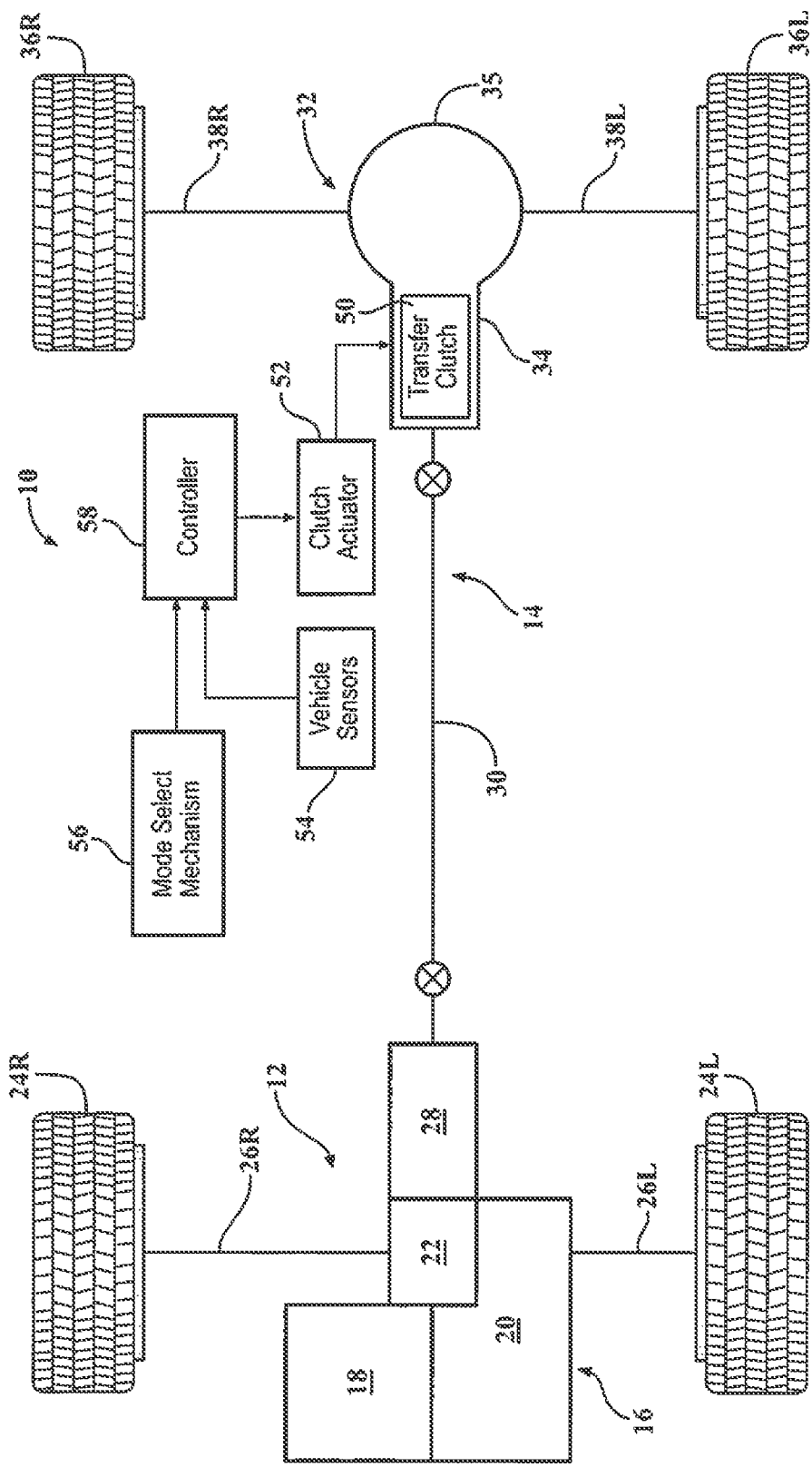
FIG. 1 is a schematic illustration of a drivetrain of an all-wheel drive motor vehicle equipped with a power transmission device in accordance with an aspect of the present

With particular reference to FIG. 1 of the drawings, a drivetrain 10 for an all-wheel drive vehicle is shown. The drivetrain 10 may include a primary driveline 12, a secondary driveline 14, and a powertrain 16 for delivering rotary tractive power (i.e., drive torque) to the drivelines. In the particular arrangement shown, the primary driveline 12 may be the front driveline while the secondary driveline 14 may be the rear driveline. The powertrain 16 is shown to include an engine 18 and a multi-speed transmission 20. The front driveline 12 may include a front differential 22 driven by the powertrain 16 for transmitting drive torque to a pair of front wheels 24L and 24R through a pair of front axleshafts 26L and 26R, respectively. The front differential 22 may be integrated into the transmission 20 when configured as a transaxle. The rear driveline 14 may include a power transfer unit 28 driven by the powertrain 16 or the front differential 22, a propshaft 30 driven by the power transfer unit 28, a rear axle assembly 32, and a power transmission device 34 for selectively transferring drive torque from the propshaft 30 to the rear axle assembly 32. The rear axle assembly 32 is shown to include a rear differential 35, a pair of rear wheels 36L and 36R and a pair of rear axleshafts 38L and 38R that interconnect the rear differential 35 to corresponding rear wheels 36L and 36R.

With continued reference to the drawings, the drivetrain 10 may further include an electronically-controlled power transfer system for permitting a vehicle operator to select a locked ("part-time") four-wheel drive mode, and an adaptive ("on-demand") four-wheel drive mode. In this regard, the power transmission device 34 may be equipped with a torque transfer mechanism having a transfer clutch 50 that can be selectively actuated for transferring drive torque from the propshaft 30 to the rear axle assembly 32 for establishing the part-time and on-demand four-wheel drive modes. The torque transfer mechanism may further include a power-operated clutch actuator 52 for actuating transfer clutch 50. The power transfer system may also include one or more vehicle sensors 54 for detecting certain dynamic and operational characteristics of motor vehicle 10, a mode select mechanism 56 for permitting the vehicle operator to select one of the available drive modes, and a controller 58 for controlling actuation of the clutch actuator 52 in response to input signals from vehicle sensors 54 and the mode selector 56. Obviously, the power transfer system may include more or less features.

Figure 2:
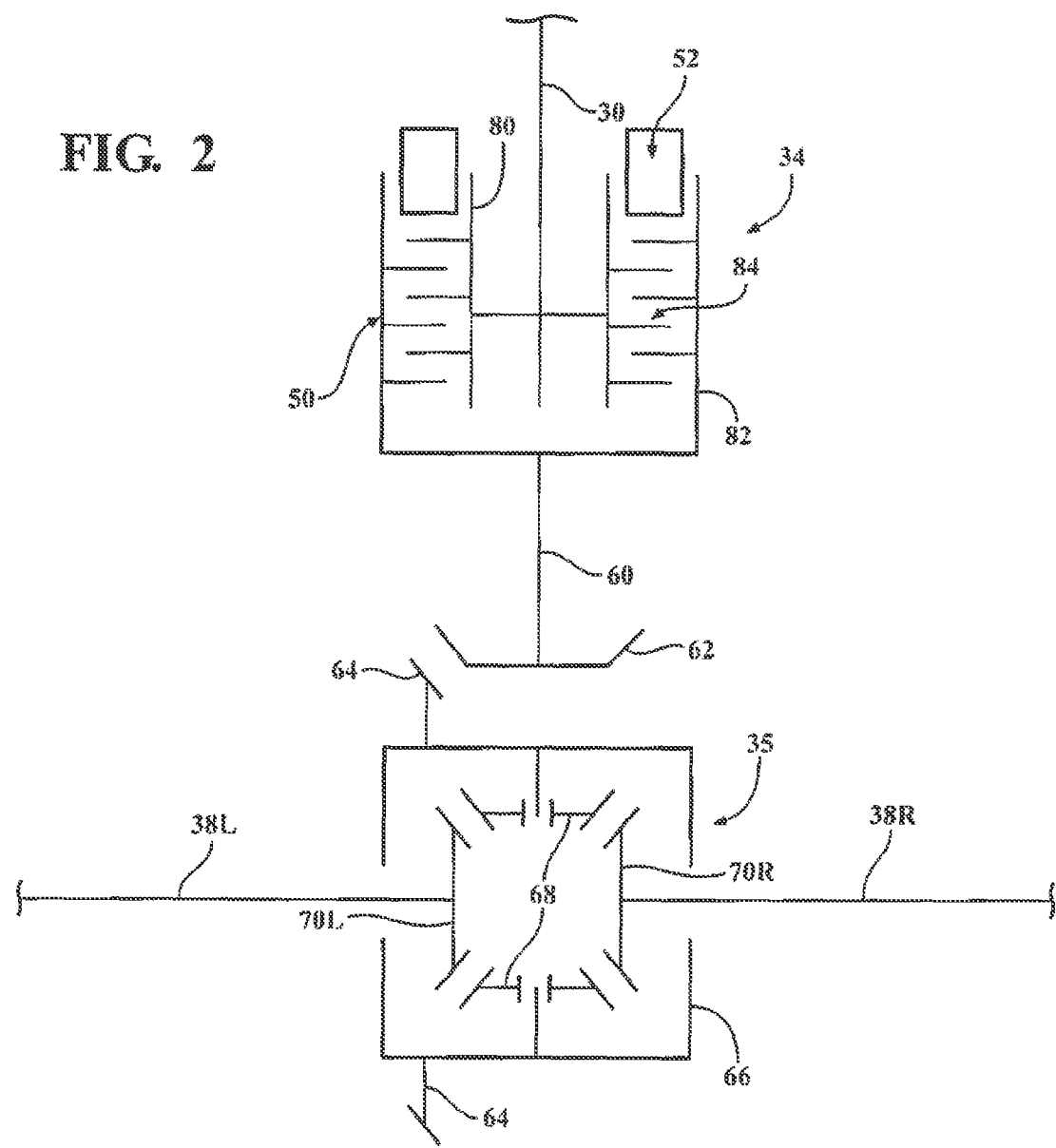
FIG. 2 is a schematic illustration of the power transmission device shown in FIG. 1 associated with a drive axle assembly and equipped with a torque transfer mechanism having a multi-plate clutch assembly and a power-operated clutch actuator assembly.

Power transmission device 34 is shown schematically in FIG. 2 to include a torque transfer mechanism or torque coupling 34 that is operably disposed between the propshaft 30 and a pinion shaft 60. As seen, the pinion shaft 60 can include a pinion gear 62 that is meshed with a hypoid ring gear 64 that is fixed to a differential case 66 of the rear differential 35. The rear differential 35 may be conventional in that a plurality of pinions 68, which are driven by the case 66, are arranged to communicate with a pair of drive side gears 70L and 70R that are fixed for rotation with corresponding axleshafts 38L and 38R. The torque coupling 34 is shown to include the transfer clutch 50 and the clutch actuator 52, which are arranged to control the transfer of drive torque from the propshaft 30 to the pinion shaft 60 and which together define the torque transfer mechanism of the present disclosure.

Figure 3:
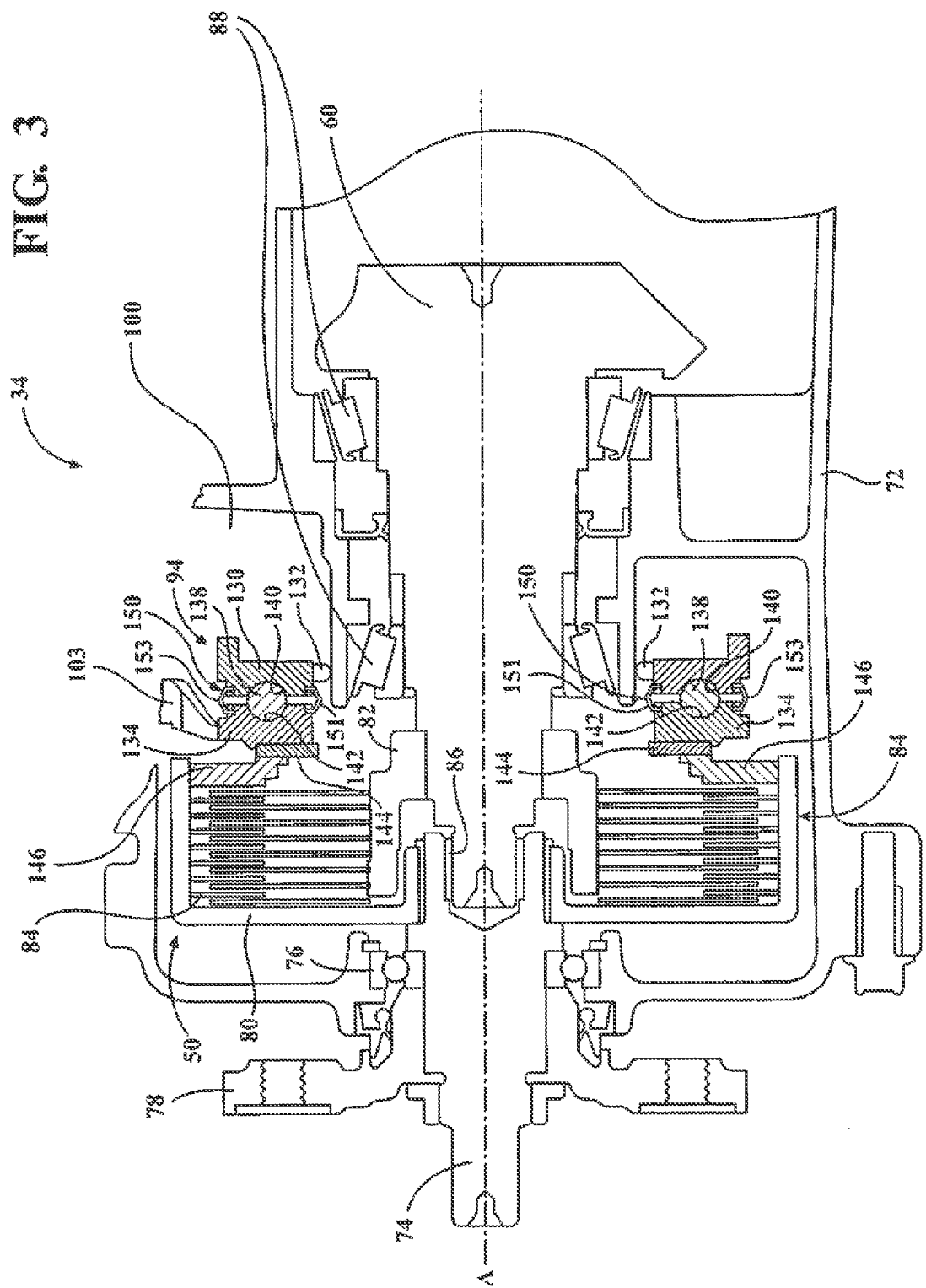
FIG. 3 is a partial sectional view of the power transmission device constructed in accordance with the teachings of the present disclosure.

Referring primarily to FIGS. 3-4, the components and function of a torque coupling device 34 constructed in accordance with an aspect of the disclosure are described. As seen, the torque coupling device 34 may generally include a housing 72, an input shaft 74 rotatably supported in the housing 72 via a bearing assembly 76, the transfer clutch 50 and the clutch actuator 52. A yoke 78 may be fixed to a first end of the input shaft 74 to permit connection with the propshaft 30. The transfer clutch 50 may include a first clutch member 80 fixed (i.e., splined) for rotation with the input shaft 74, a second clutch member 82 fixed (i.e. splined) for rotation with the pinion shaft 60, and a multi-plate clutch pack 84 comprised of alternating inner and outer clutch plates that are disposed between the first clutch member 80 and the second clutch member 82. As shown, the first clutch member is a clutch drum 80 while the second clutch member is a hub 82. A first bearing assembly 86 can rotatably support a second end of the input abaft 74 in the pinion shaft 60 which, in turn, is rotatably supported in the housing 72 via a pair of second bearing assemblies 88.

Figure 3A:
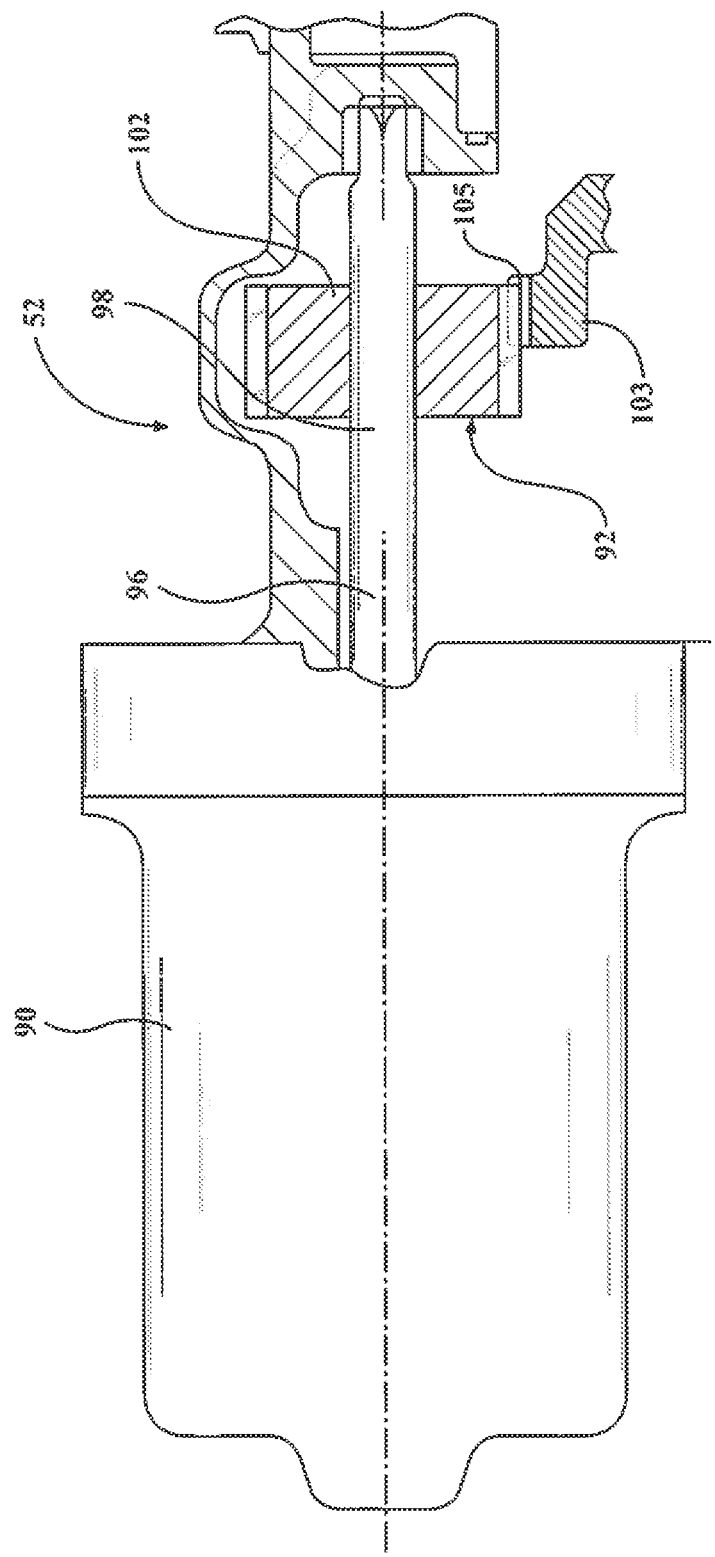
FIG. 3A is a partial sectional view showing components of the clutch actuator assembly in accordance with an aspect of the present disclosure.

As best presented in FIGS. 3 and 3A, the clutch actuator assembly 52 is generally shown to include an electric motor 90, a geared drive unit 92 and a clutch apply operator 94. The electric motor 90 may be secured to the housing 72 and include a rotary output shaft 96. The geared drive unit 92 can be driven by the motor output shaft 96 and functions to control relative movement between components of the clutch apply operator 94 for controlling the magnitude of a clutch engagement force applied to the clutch pack 84 of the transfer clutch 50. In addition, the geared drive unit 92 can include a gearset which provides a desired speed reduction between the motor shaft 96 and a rotary component of the clutch apply operator 94, In accordance with the example construction shown in FIG. 3A, the gearset of geared drive unit 92 may include a first gear 98 driven by motor shaft 96 that may be meshed with a second gear 102. Pursuant to one aspect of the disclosure, the first gear 98 may be a worm that is formed integrally on or fixed to the motor shaft 96 while the second gear 102 may be a worm gear. Further, a third gear 103 may be meshed with the second gear 102. The third gear 103 may be a sector gear that includes sector gear teeth 105 that mesh with the second gear 103. It is contemplated that alternative gear arrangements could be used in geared drive unit 92 instead of those discussed above. For purposes of convenience, the clutch actuator assembly 52 is schematically shown in FIGS. 4, and 6-7.

The clutch apply operator 94 is best shown in Fits 3 and 4 to define a ball-ramp unit having a first cam plate 130 that is non-rotatably fixed via a spline connection 132 to the housing 72 and a second cam plate 134 that is rotatable about the pinion shaft 60 and the axis A. The second cam plate 134 is axially spaced from the first cam plate 130 to define a cavity 131 between the first and second earn plates 130, 134. As best presented in FIG. 3A, the sector gear 103 of the geared drive unit 92 may be formed integrally with, or rigidly fixed to, the second cam plate 134 so as to rotate the second cam plate 134. It is contemplated that alternative gear arrangements could be used in geared drive unit 92 instead of those discussed above to facilitate both rotary and axial movement of the second cam plate 134 in response to rotation of the motor output shaft 96.

The first cam plate 130 defines a plurality of first cam recesses 140 and the second cam plate 134 defines a plurality of second cam recesses 142, each in alignment with one of the first cam recesses 140. In addition, a ball 138 is disposed in the cavity 131 in each of the plurality of aligned sets of first and second cam recesses 140 and 142. Preferably, three equally-spaced sets of such facing first and second cam recesses 140 and 142 are formed in the first and second cam plates 130 and 134, respectively. The first and second cam recesses 140 and 142 may be formed as cam surfaces that are ramped, tapered or otherwise contoured in a circumferential direction. In operation, the balls 138 roll against the cam surfaces 140 and 142 so as to cause axial movement of the second cam plate 134 relative to first cam plate 130 along the axis A in response to rotation of the second cam plate 134. As an alternative to the arrangement shown, one of cam surfaces 140 and 142 can be non-tapered such that the ramping profile is configured entirely within the other of the cam surfaces. Also, the balls 138 are shown be spherical, but are contemplated to permit use of cylindrical rollers disposed in correspondingly shaped cam recesses or surfaces. It is contemplated that alternative gear arrangements could be used in geared drive unit 92 instead of those discussed above to facilitate rotary movement of the second cam plate 134 in response to rotation of the motor output shaft 96.

Figure 5A:
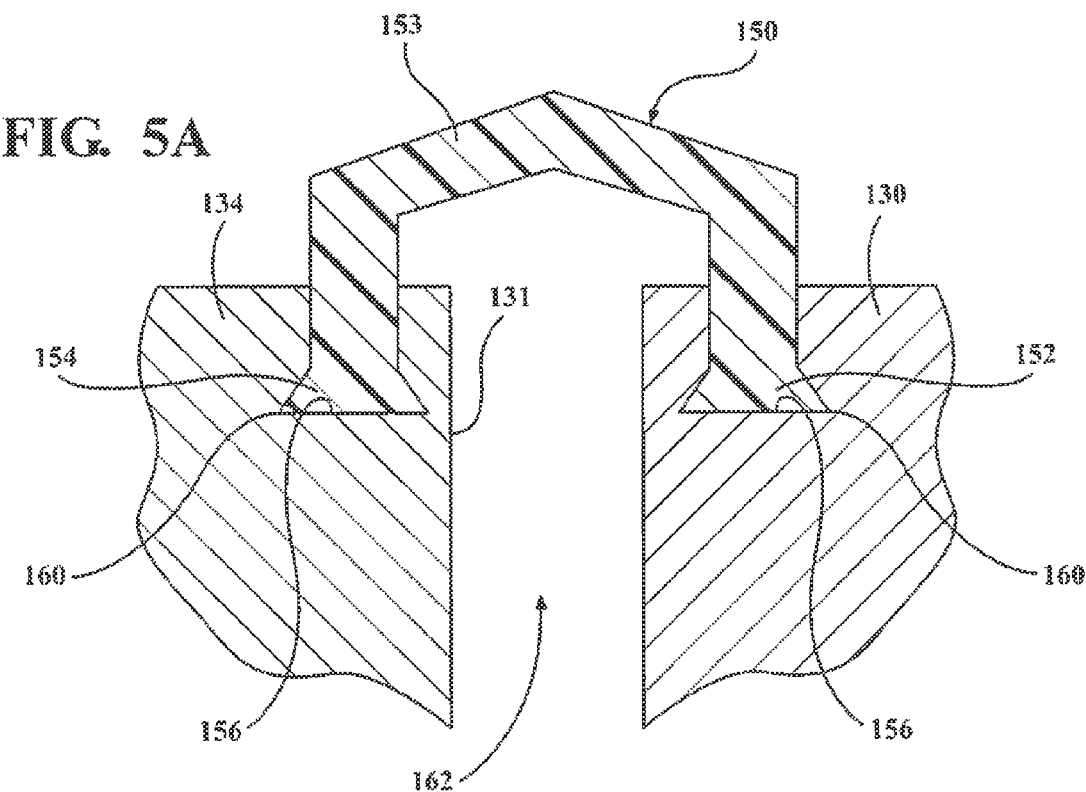
FIG. 5A is a schematic illustration of a sealed ball-ramp clutch operator in a closed position and configured in accordance with an aspect of the present disclosure.
Figure 5B:
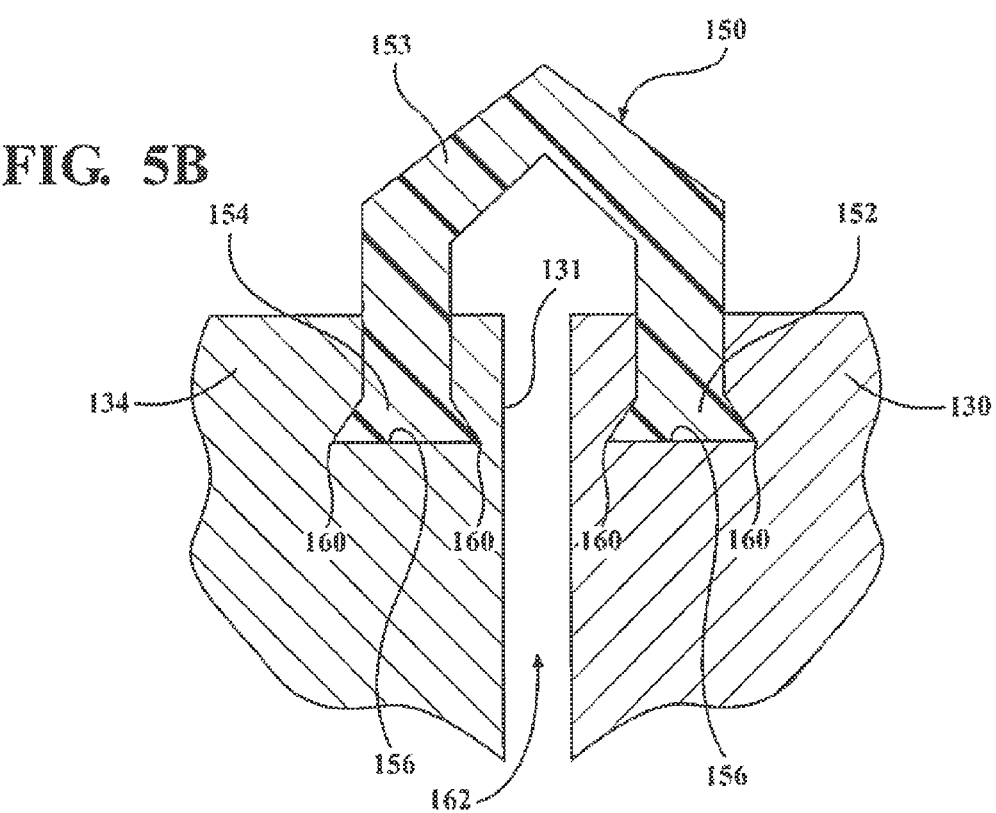
FIG. 5B is a schematic illustration of the sealed ball-ramp clutch operator in an extended position and configured in accordance with an aspect of the present disclosure.

According to an aspect of the disclosure best shown in FIGS. 4, 5A and 5B, a sealing arrangement 150 is provided to seal off the cavity 131 between the first cam plate 130 and the second cam plate 134 and define a "sealed" ball-ramp operator unit. The sealing arrangement 150 may include a first or inside seal component 151 and a second or outside seal component 153 spaced radially outwardly from the inside seal component 151. According to an aspect, the first cam plate 130 and the second cam plate 134 each define an outer groove 156 and an inner groove 158 that are machined therein. The outside seal component 153 includes a first end 152 that is fixedly disposed in the outer groove 156 of the first cam plate 130 and a second end 154 that is fixedly disposed in the outer groove 156 of the second cam plate 134. Similarly, the inside seal component 151 includes a first end 155 that is disposed in the inner groove 158 of the first earn plate 130 and a second end 157 that is disposed in the inner groove 158 of the second cam plate 134. The first and second ends 152, 154 of outside seal components 153 include a retention mechanism 160 to assist in their retention within the respective outer grooves 156. While not specifically shown, a similar retention mechanism may be used with ends 155, 157 of the inner seal component 151. According to an aspect of the disclosure, the retention mechanism 160 includes a barb that extends outwardly adjacent to the first and second ends 152, 154 of the sealing components 151, 153 for engaging an indent extending from the groove 156. Other types of sealing elements with a variety of different configurations could be employed.

According to an aspect, the sealing arrangement 150 may be configured as a bellows type seal. Additionally, the seal components 151, 153 of the sealing arrangement 150 could be molded elements that allow for rotation and axial displacement of the first cam plate 130 with respect to the second cam plate 134. FIG 5B illustrates the second cam plate 134 in a closed position relative to first cam plate 130 and the sealing arrangement 150 in an unextended position. FIG. 5A illustrates second cam plate 134 in an extended position relative to the first cam plate 130 with the sealing arrangement 150 in an extended position. According to this aspect, the amount of relative rotation between the cam plates 130, 134 is less than a full rotation thereof. The sealing arrangement 150 can serve to seal of a cavity 162 between the first cam plate 130 and the second cam plate 134, such that grease or other lubricant that is necessary for operation of the cam surfaces over their lifetime could be disposed and retained in the cavity 162. The inclusion of the sealing arrangement 150 allows for dry operation of the clutch actuator assembly 52. Thus, each seal component 151, 153 is adapted to permit axial movement and rotational movement between the cam plates 130, 134. While the example illustrates the first cam plate 130 being stationary, both axially and rotationally, it is contemplated that the "sealed" ball-ramp unit can be modified to permit rotational movement of both cam plates 130, 134, or rotational movement of the first cam plate 130 and non-rotational and axial movement of the second cam plate 134.

As best presented in FIG. 4, a first thrust assembly 144 may be disposed between the second cam plate 134 and an actuator plate 146 of the clutch pack 84. As is known, the drum 80 (or hub 82) can include a reaction ring, with the clutch pack 84 being located between the reaction ring and the actuator plate 146. The actuator plate 146 may be engaged to the drum 80 or hub 82 which results in rotation thereof relative to the second cam plate 134. As seen, actuator plate 146 is splined for rotation with, and axial movement relative to the drum 80, As known in the art, a return spring arrangement may be provided to bias the actuator plate 146 away from clutch pack 84 which, in turn, biases the second cam plate 134 toward its retracted position relative to the first cam plate 130.

As best presented in FIGS. 3 and 4, according to an aspect, the first thrust assembly 144 may be configured as a thrust washer 144 disposed between the second cam plate 134 and the actuator plate 146. The thrust washer 144 may be constructed of a polymide/graphite material, which allows for operation while dry. According to another aspect, the thrust washer 144 is capable of accommodating the required pressure and rotational speed by regulating the diameter of the thrust washer 144 and load applied thereto may be regulated to remain within the allowable pressure velocity (PV) region of the material. It will be appreciated that a variety of other materials may be employed. It will be appreciated that the use of dry friction can allow the thrust washer 144 to remain within the appropriate material constraints in view of the fact that a higher coefficient of friction can result in lower pressures.

The second cam plate 134 may be axially moveable relative to the clutch pack 84 between a first or "released" position and a second or "locked" position. With the second cam plate 134 in its released position, a minimum the clutch engagement force is exerted by the actuator plate 146 on the clutch pack 84 such that virtually no drive torque is transferred from the input shaft 74 through the clutch pack 84 to the pinion shaft 60. In this manner, a two-wheel drive mode is established. The return spring may be provided to normally bias the second cam plate 134 toward its released position. In contrast, the location of the second cam plate 134 in its locked position causes a maximum clutch engagement force to be applied by the actuator plate 146 to the clutch pack 84 such that the pinion shaft 60 is, in effect, coupled for common rotation with the input shaft 74. In this manner, the locked or part-time four-wheel drive mode is established. Therefore, accurate bidirectional control of the axial position of the second cam plate 134 between its released and locked positions permits adaptive regulation of the amount of drive torque transferred from the input shaft 74 to the pinion shaft 60, thereby establishing the on-demand four-wheel drive mode.

The tapered contour of the cam surfaces 140 and 142 is selected to control the axial translation of the second cam plate 134 relative to the clutch pack 84 from its released position to its locked position in response to the first gear 98 being driven by the motor 90 in a first rotary direction. Such rotation of the first gear 98 in a first direction induces rotation of the second cam plate 134 about axis A in a first direction. As a result, corresponding relative rotation between the cam plates 130 and 134 occurs such that the balls 138 ride against the tapered cam surfaces 140 and 142. However, since first the cam plate 130 is restrained against axial and rotational movement, such rotation of the second cam plate 134 causes concurrent axial movement of the second cam plate 134 toward its locked position for increasing the clutch engagement force on the clutch pack 84.

FIG. 6 illustrates another aspect of the present disclosure. As shown the differences between this aspect and that illustrated in FIGS. 3 and 4 reside primarily in the clutch apply operator 94A. To the extent other features are not specifically discussed below, the discussion above applies equally to this aspect. In general, clutch apply operator 94A eliminates thrust bearing 144 by integrating a bearing assembly 244 between actuator plate 146A and second cam plate 134A. As illustrated, according to an aspect, the first thrust assembly may be configured as an angular contact bearing assembly 244. The angular contact bearing assembly 244 is formed between second cam plate 134A and the actuator plate 146A of the clutch pack 84 to effectuate engagement. The angular contact bearing assembly 244 includes a first flange 166 that extends axially from the actuator plate 146A, and a second flange 168 that extends axially from the second cam plate 134A in generally spaced and parallel relationship with the first flange 166. The first and second flanges 166, 168 could be integrally formed with the respective actuator plate 146A and second cam plate 134A. A first sloped portion 159 extends from the first flange 166 toward the second flange 168, and a second sloped portion 171 extends from the second flange 168 toward the first flange 166. A plurality of bearing elements 169 are disposed between the first and second flanges 166, 168 and the first and second sloped portions 159, 171. Further, a pair of seal elements 173 extend between the first and second flanges 166, 168 on opposing sides of the bearing elements 169 to seal the bearing elements 169 between the first and second flanges 166, 168. The actuator plate 146A may be engaged (i.e. splined) to the drum 80 which results in rotation thereof while the second cam plate 134A remains tied to the housing 72. According to an aspect, the formation of the thrust assembly 244 in this fashion permits relative rotation between the actuator plate 146A and the second cam element 134A of the sealed ball-ramp unit. According to this aspect, the configuration of the first thrust assembly 244 eliminates the need for an additional thrust washer as it is configured to accommodate the higher propshaft speeds and loads.

FIG. 7 illustrates another aspect of the present disclosure. As shown the differences between this aspect and that illustrated in FIGS. 3, 4 and 6, asides primarily in the clutch apply operator 94B. To the extent other features are not specifically discussed below, the discussion above applies equally to this aspect. A first thrust assembly 344 may be disposed between the second cam plate 134B and an actuator plate 146B of the clutch pack 84 to effectuate engagement. The actuator plate 146B may be engaged (splined) to the drum 80 which results in rotation thereof while which the second cam plate 134B remains tied to the housing 72. According to an aspect, a first projection 181 extends axially from the actuator plate 146B, and a second projection 183 extends axially from the second cam plate 134B in generally spaced and parallel relationship with the first projection 183 to define an annular bore 172 between the first and second projections 181, 183. According to this aspect of the disclosure, the first thrust assembly is an axial bearing assembly 344 disposed in the annular bore 172. The axial bearing assembly 344 may include an outer sleeve 185 that extends in parallel and abutting relationship with the first projection 181 and an inner sleeve 187 that extends in parallel and abutting relationship with the second projection 183. Further, a first arc portion 189 extends from the outer sleeve 185 toward the second projection 183, and a second arc portion 191 extends from the inner sleeve 187 toward the first projection 181. A plurality of bearing components 193 are disposed between the first and second projections 181, 183 and the first and second arc portions 189, 191. Additionally, a pair of seals 195 extend between the first and second projections 181, 183 on opposing sides of the bearing components 193 to seal the bearing components 193 between the first and second projections 181, 183. It should be appreciated that the axial bearing assembly 344 may be assembled and snapped or otherwise fit into the bore 172. According to another aspect, other suitable bearings may be employed such as standard available "catalogue" bearings. Again, the formation of the thrust assembly 344 in this fashion is sufficient to allow rotation between the actuator plate 146B and the second cam element 134B. The first thrust assembly 344 according to this aspect eliminates the need for an additional thrust washer as the first thrust assembly 344 can accommodate higher propshaft 30 speeds and loads.

FIG. 8 illustrates yet another aspect of the present disclosure. As shown, the differences between this aspect and that illustrated in FIGS. 3 and 4 reside primarily in the clutch apply operator 94C. To the extent other features are not specifically discussed in connection with this aspect, the discussion above applies equally herein. According to an aspect, a seal housing 251 extends about the operator 94C and the geared drive unit 92. Such an arrangement would help retain lubricant in the area of the components of the geared drive unit 92. In further detail, the seal housing 251 could include a casing 253 made of a rigid material that extends about the geared drive unit 92 and is connected to the housing 72. The seal housing 251 further may include a first edge seal 255 disposed between the casing 253 and the second cam plate 134C to seal the area between the casing 253 and second cam plate 134C. The first edge seal 255 could be a lip seal. This would eliminate the upper bellows seal discussed in connection with other aspects herein. The seal housing 251 may further include a second edge seal 257 disposed between the casing 253 and the first cam plate 130. The second edge seal may 257 consist of an o-ring or the like.

It will be appreciated that the clutch actuator 52 can be positioned to account for in-vehicle packaging requirements. For example, the rotary axis of shaft 96 of the electric motor 90 could be aligned parallel to axis A extending along the power transmission device 34. According to another aspect, the electric motor 90 may be perpendicular to axis A, extending from power transmission device 34. Further, the electric motor 90 could be angularly positioned at an angle a relative to a horizontal axis of the power transmission device 34 to further accommodate in-vehicle packaging requirements.

In operation, when the mode selector 56 indicates selection of the two-wheel drive mode, the controller 58 signals the electric motor 90 to rotate the motor shaft 96 in the second direction for moving the second cam plate 134 until it is located in its released position, thereby releasing the clutch pack 84. As noted, a return spring may assist in returning the second cam plate 134 to its released position. If the mode selector 56 thereafter indicates selection of the part-time four-wheel drive mode, the electric motor 90 maybe is signaled by the controller 58 to rotate the motor 96 in the first direction for inducing axial translation of the second cam plate 134 until it is located in its locked position. As noted, such axial movement of the second cam plate 134 to its locked position acts to fully engage the clutch pack 84, thereby coupling the pinion shaft 60 to the input shaft 74.

When the mode selector 56 indicates selection of the on-demand four-wheel drive mode, the controller 58 energizes the electric motor 90 to rotate the motor 96 until the second cam plate 134 is axially located in a ready or "stand-by" position. This position may be its released position or, in the alternative, an intermediate position. In either case, a predetermined minimum amount of drive torque is delivered to the pinion shaft 60 through the clutch pack 84 in this stand-by condition. Thereafter, the controller 58 determines when and how much drive torque needs to be transferred to the pinion shaft 60 based on current tractive conditions and/or operating characteristics of the motor vehicle, as detected by the sensors 54. As will be appreciated, any control schemes known in the art can be used with the present disclosure for adaptively controlling actuation of the transfer clutch 50 in a driveline application. The arrangement described for the clutch actuator 52 is an improvement over the prior art in that the torque amplification provided by the geared drive unit 92 permits use of a small low-power electric motor and yet provides extremely quick response and precise control. Other advantages are realized in the reduced number of components and packaging flexibility.

Figure 9:
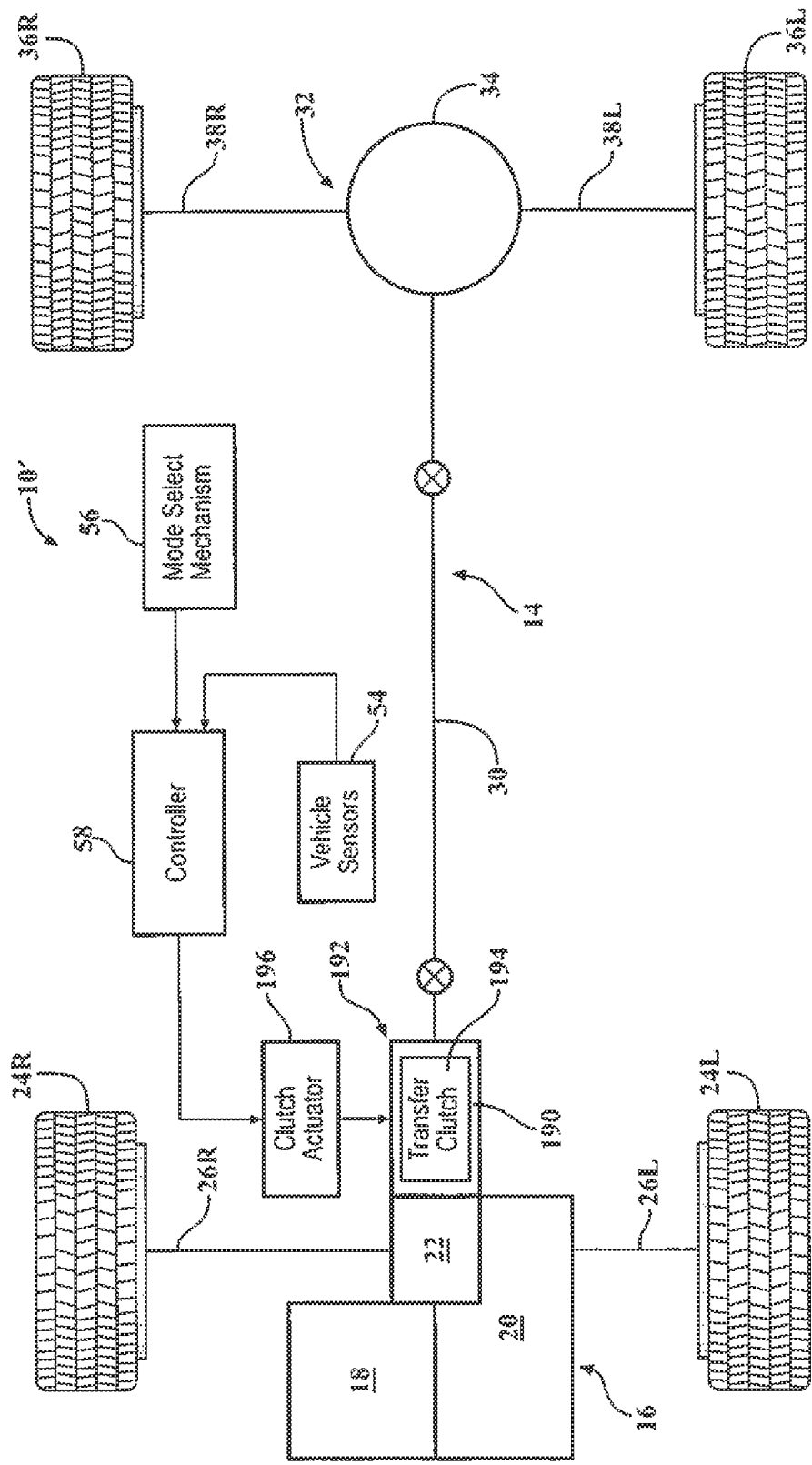
FIG. 9 is a schematic illustration of an alternative drivetrain for an all-wheel drive vehicle equipped with one of the power transmission devices in accordance with the present disclosure.

To illustrate an alternative power transmission device to which the present disclosure is applicable, FIG. 9 schematically depicts a front-wheel based four-wheel drivetrain layout 10' for a motor vehicle. In particular, the engine 18 drives a multi-speed transmission 20 having an integrated front differential unit 22 for driving front wheels 24L and 24R via axleshafts 26L and 26R. A power transfer unit 190 is also driven by the powertrain 16 for delivering drive torque to the input member of a torque transfer mechanism, hereinafter referred to as torque coupling 192, that is operable for selectively transferring drive torque to the propshaft 30. Accordingly, when sensors indicate the occurrence of a front wheel slip condition, the controller 58 adaptively controls actuation of the torque coupling 192 such that drive torque is delivered "on-demand" to the rear driveline 14 for driving rear wheels 36L and 36R. It is contemplated that the torque transfer coupling 192 would include a multi-plate clutch assembly 194 and a clutch actuator 196 that are generally similar in structure and function to multi-plate transfer clutch 50 and clutch actuator 52 previously described in connection with the various aspects above.

Figure 10:
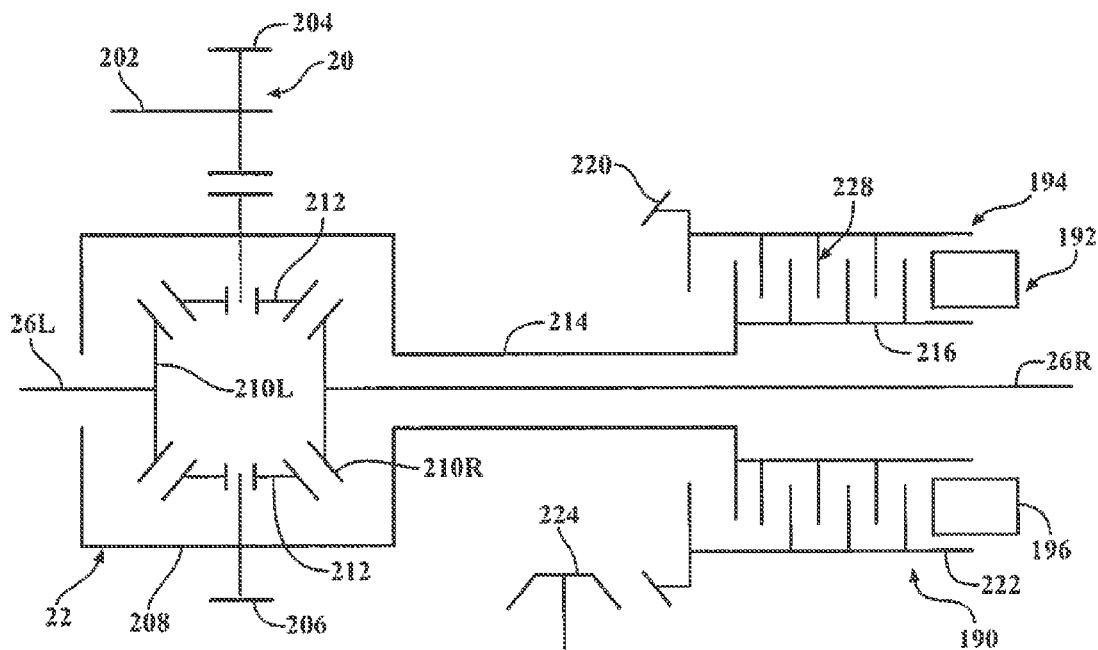
FIG. 10 is a schematic illustration of a power transmission device in accordance with still another aspect of the present disclosure.

Referring to FIG. 10, power transfer unit 190 is now schematically illustrated in association with an on-demand ail-wheel drive system based on a front-wheel drive vehicle similar to that shown in FIG. 9. In particular, an output shaft 202 of transmission 20 is shown to drive an output gear 204 which, in turn, drives an input gear 206 fixed to a carrier 208 associated with the front differential unit 22. To provide drive torque to the front wheels 24L and 24R, the front differential 22 further includes a pair of side gears 210L and 210R that are connected to the front wheels via corresponding axleshafts 26L and 26R. The differential unit 22 also can include pinions 212 that are rotatably supported on pinion shafts fixed to the carrier 208 and which are meshed with both side gears 210L and 210R. A transfer shaft 214 may be provided to transfer drive torque from carrier 208 to the torque coupling 192.

The power transfer unit 190 may include a right-angled drive mechanism having a ring gear 220 fixed for rotation with a drum 222 of the clutch assembly 194 and which is meshed with a pinion gear 224 fixed for rotation with the propshaft 30. As seen, a clutch hub 216 of the clutch assembly 194 is driven by transfer shaft 214 while a clutch pack 228 is disposed between the hub 216 and the drum 222. The clutch actuator assembly 196 is operable for controlling engagement of the clutch assembly 194. The clutch actuator assembly 196 is intended to be similar to motor-driven clutch actuator assembly 52 previously described in that an electric motor is supplied with electric current for controlling relative rotation of a geared drive unit which, in turn, controls translational movement of a cam plate operator for controlling engagement of the clutch pack 228.

In operation, drive torque is transferred from the primary (i.e., front) driveline to the secondary (i.e., rear) driveline in accordance with the particular mode selected by the vehicle operator via the mode selector 56. For example, if the on-demand four-wheel drive mode is selected, the controller 58 modulates actuation of the clutch actuator assembly 196 in response to the vehicle operating conditions detected by the sensors 54 by varying the value of the electric control signal sent to the electric motor. In this manner, the level of clutch engagement and the amount of drive torque that is transferred through the clutch pack 228 to the rear driveline 14 through power transfer unit 190 is adaptively controlled. Selection of the part-time four-wheel drive mode results in full engagement of the clutch assembly 194 for rigidly coupling the front driveline to the rear driveline. In some applications, the mode selector 56 may be eliminated such that only the on-demand four-wheel drive mode is available so as to continuously provide adaptive traction control without input from the vehicle operator.

Figure 11:
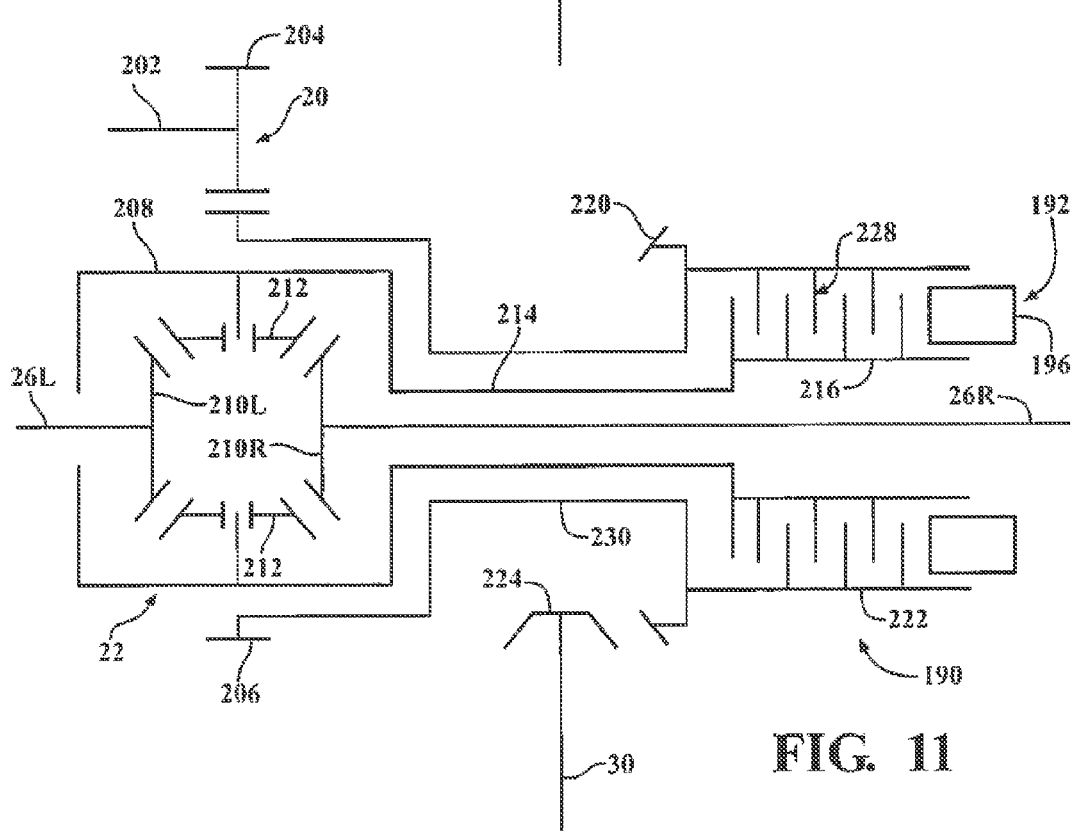
FIG. 11 is a schematic illustration of a power transmission device in accordance with a further aspect of the present disclosure.

FIG. 11 illustrates a modified version of FIG. 10 wherein an on-demand four-wheel drive system is shown based on a rear-wheel drive motor vehicle that is arranged to normally deliver drive torque to the rear driveline 14 while selectively transmitting drive torque to the front wheels 24L and 24R through the torque coupling 192. In this arrangement, drive torque is transmitted directly from transmission the output shaft 202 to the transfer unit 190 via a drive shaft 230 interconnecting the input gear 206 to the ring gear 220. To provide drive torque to the front wheels, the torque coupling 192 is shown operably disposed between the drive shaft 230 and the transfer shaft 214. In particular, the clutch assembly 194 is arranged such that the drum 222 is driven with the ring gear 220 by the drive shaft 230. As such, actuation of the clutch actuator 196 functions to transfer torque from the drum 222 through the clutch pack 228 to the hub 216 which, in turn, drives the carrier 208 of the front differential unit 22 via the transfer shaft 214. Again, the vehicle could be equipped with a mode selector 56 to permit selection by the vehicle operator of either the adaptively controlled on-demand four-wheel drive mode or the locked part-time four-wheel drive mode. In vehicles without a mode selector 56, the on-demand four-wheel drive mode is the only drive mode available and provides continuous adaptive traction control without input from the vehicle operator.

Figure 12:
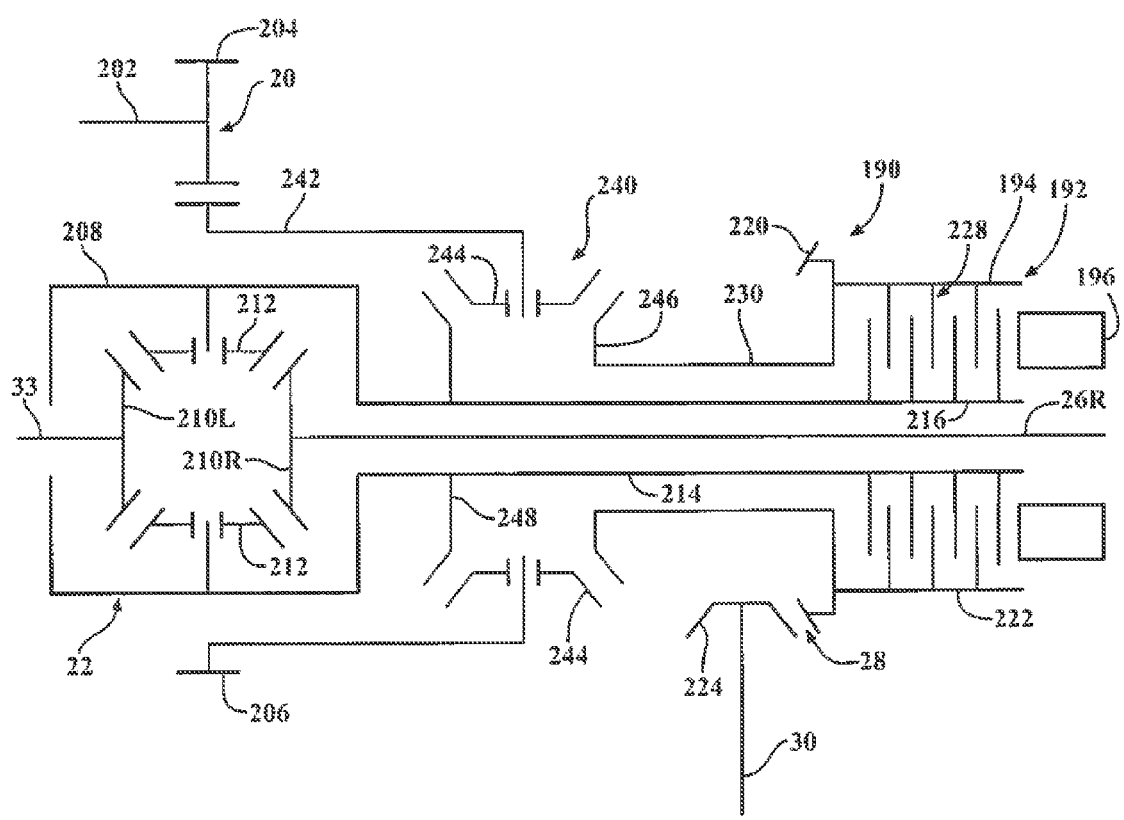
FIG. 12 is a schematic illustration of a power transmission device in accordance with yet another aspect of the present disclosure.

In addition to the on-demand 4WD systems shown previously, the power transmission technology of the present disclosure can likewise he used in full-time 4WD systems to adaptively bias the torque distribution transmitted by a center or "interaxle" differential unit to the front and rear drivelines. For example, FIG. 12 schematically illustrates a full-time four-wheel drive system which is generally similar to the on-demand four-wheel drive system shown in FIG. 10 with the exception that the power transfer unit 190 now includes an interaxle differential unit 240 that is operably installed between the carrier 208 of the front differential unit 22 and the transfer shaft 214. In particular, the output gear 206 is fixed for rotation with a carrier 242 of interaxle differential 240 from which the pinion gears 244 are rotatably supported. A first side gear 246 is meshed with the pinion gears 244 and is fixed for rotation with the drive shaft 230 so as to be drivingly interconnected to the rear driveline 14 through the transfer gearset 220 and 224. Likewise, a second side gear 248 is meshed with the pinion gears 244 and is fixed for rotation with the carrier 208 of the front differential unit 22 so as to be drivingly interconnected to the front driveline. The torque coupling 192 is now shown to be operably disposed between the side gears 246 and 248. As such, the torque coupling 192 is operably arranged between the driven outputs of interaxle differential 240 for providing a torque biasing and slip limiting function. The torque coupling 192 is shown to again include a multi-plate clutch assembly 194 and clutch actuator assembly 196. The clutch assembly 194 is operably arranged between the transfer shaft 214 and the driveshaft 230. In operation, when the sensor 54 detects a vehicle operating condition, such as excessive interaxle slip, the controller 58 adaptively controls activation of the electric motor associated with the clutch actuator assembly 196 for controlling engagement of the clutch assembly 194 and thus the torque biasing between the front and rear drivelines.

Note that not all of the activities described above in the general description or the examples are required, that a portion of a specific activity may not be required, and that one or more further activities may be performed in addition to those described. Still further, the orders in which activities are listed are not necessarily the order in which they are performed.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any sub combination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims.

In the claims, means-plus-function clauses are intended to cover the structures described herein as performing the recited function and not only structural equivalents, but also equivalent structures.

What is claimed is:

1. A power transmission apparatus comprising:
   a rotary input member adapted to receive drive torque from a power source;
   a rotary output member adapted to provide drive torque to an output device;
   a torque transfer mechanism operable for transferring drive torque from said input member to said output member, said torque transfer mechanism including a clutch assembly operably disposed between said input member and said output member, and a clutch actuator assembly for applying a clutch engagement force to said clutch assembly, said clutch actuator assembly including an electric motor driving a geared drive unit for controlling said clutch engagement force that is applied to said clutch assembly by a clutch apply operator, said clutch apply operator including a first cam plate and a second cam plate driven by said geared drive unit, said second cam plate being axially spaced from said first cam plate to define a cavity between said first and second cam plates, said first cam plate defining a plurality of first cam recesses and said second cam plate defining a plurality of second cam recesses, said clutch apply operator further including a plurality of rollers each disposed between one of said first cam recesses and one of said second cam recesses within said cavity, at least one of said first and second cam recesses being tapered for causing axial movement of said second cam plate relative to said first cam plate during rotation of said second cam plate; and
   a sealing arrangement extending between said first and second cam plates to seal said cavity between said first and second cam plates for retaining a lubricant in said cavity, wherein said sealing arrangement includes an inside seal component and an outside seal component spaced radially outwardly from said inside seal component, and wherein said inside and outside seal components are of a bellows type and made of a flexible material for allowing axial movement of said second cam plate relative to said first cam plate and allowing rotation of said second cam plate relative to said first cam plate.

2. The power transmission apparatus as set forth in claim 1 wherein said first cam plate and said second cam plate each define at least one groove, and wherein said inside and outside seal components each include a first end fixedly disposed in said groove of said first cam plate and a second end fixedly disposed in said groove of said second cam plate.

3. The power transmission apparatus as set forth in claim 2 wherein said first end and said second end of each of said inside and outside seal components includes a retention mechanism connecting said first and second ends to said grooves.

4. The power transmission apparatus as set forth in claim 3 wherein each of said retention mechanisms of said inside and outside seal components include at least one barb extending outwardly from said first and second ends of said respective first and second seal components for securing said inside and outside seal components to said grooves.

5. The power transmission apparatus as set forth in claim 1 wherein said outside seal component extends about said geared drive unit for retaining fluids of said geared drive unit.

6. The power transmission apparatus as set forth in claim 5 wherein said outside seal component includes a casing made of a rigid material that extends about said geared drive unit and is connected to a housing, and wherein said outside seal component further includes a first edge seal disposed between said casing and said second cam plate and a second edge seal disposed between said casing and said first cam plate.

7. The power transmission apparatus as set forth in claim 6 wherein said first edge seal is of a lip seal type and said second edge seal is an o-ring.

8. The power transmission apparatus as set forth in claim 1 wherein said clutch assembly includes a first clutch member fixed for rotation with said input member, a second clutch member fixed for rotation with said output member, and a clutch pack operably disposed between said first and second clutch members, said clutch pack including an actuator plate moveable between a first position whereat a minimum clutch engagement force is exerted on said clutch pack and a second position whereat a maximum clutch engagement force is exerted on said clutch pack, and wherein a first thrust assembly is disposed between said second cam plate and said actuator plate.

9. The power transmission apparatus as set forth in claim 8 wherein said first thrust assembly is a thrust washer.

10. The power transmission apparatus as set forth in claim 8 wherein said first thrust assembly is an angular contact bearing assembly, and wherein said angular contact bearing assembly includes a first flange extending from said actuator plate and a second flange extending from said second cam plate in generally spaced and parallel relationship with said first flange, a first sloped portion extending from said first flange toward said second flange and a second sloped portion extending from said second flange toward said first flange, a plurality of bearing elements disposed between said first and second flanges and said first and second sloped portions, and a pair of seal elements extending between said first and second flanges on opposing sides of said bearing elements to seal said bearing elements between said first and second flanges.

11. The power transmission apparatus as set forth in claim 8 wherein a first projection extends from said actuator plate and a second projection extends from said second cam plate in generally spaced and parallel relationship with said first projection to define a bore between said first and second projections, and wherein said first thrust assembly is an axial bearing assembly disposed in said bore and including an outside sleeve extending in parallel and abutting relationship with said first projection and an inside sleeve extending in parallel and abutting relationship with said second projection, a first arc portion extending from said outside sleeve toward said second projection and a second arc portion extending from said inside sleeve toward said first projection, a plurality of bearing components disposed between said first and second projections and said inside and outside sleeves, and a pair of seal elements extending between said first and second projections on opposing sides of said bearing component to seal the bearing components between said first and second projections.

12. The power transmission apparatus as set forth in claim 1 further including a control system for actuating said electric motor so as to control a direction and an amount of rotation of said geared drive unit which, in turn, controls a direction and an amount of translational movement of said second cam plate relative to said clutch assembly.

13. The power transmission apparatus as set forth in claim 12 wherein said input member provides drive torque to a first driveline of a motor vehicle, wherein said output member is coupled to a second driveline of the motor vehicle, and wherein said torque transfer mechanism is operable to transfer drive torque from said input member to said output member.

14. The power transmission apparatus as set forth in claim 13 defining a transfer case wherein said input member is a first shaft driving the first driveline and said output member is a second shaft coupled to the second driveline, wherein location of said second cam plate in a first position releases engagement of said clutch assembly so as to define a two-wheel drive mode and location of said second cam plate in a second position fully engages said clutch assembly so as to define a part-time four-wheel drive mode, and wherein said control system is operable to control activation of said electric motor for varying the position of said second cam plate between its first and second positions to controllably vary the drive torque transferred from said first shaft to said second shaft so as to define an on-demand four-wheel drive mode.

15. The power transmission apparatus as set forth in claim 13 defining a power take-off unit wherein said input member provides drive torque to a first differential associated with the first driveline, and wherein said output member is coupled to a second differential associated with the second driveline.

16. The power transmission apparatus as set forth in claim 1 wherein said input member is a propshaft driven by a drivetrain of a motor vehicle and said output member is a pinion shaft driving a differential associated with an axle assembly of the motor vehicle, and wherein said clutch assembly is disposed between said propshaft and said pinion shaft such that actuation of said clutch actuator assembly is operable to transfer drive torque from said propshaft to said pinion shaft.

17. The power transmission apparatus as set forth in claim 1 wherein said input member includes a first differential supplying drive torque to a pair of first wheels in a motor vehicle and a transfer shaft driven by said first differential, said output member includes a propshaft coupled to a second differential interconnecting a pair of second wheels in the motor vehicle, and wherein said clutch assembly is disposed between said transfer shaft and said propshaft.

18. The power transmission apparatus as set forth in claim 1 wherein a torque member includes a first shaft supplying drive torque to a second shaft which is coupled to a first differential for driving a pair of first wheels in a motor vehicle, said output member is a third shaft driving a second differential interconnecting a pair of second wheels of the motor vehicle, and wherein said clutch assembly is operably disposed between said first and third shafts.

19. The power transmission apparatus as set forth in claim 1 further including an interaxle differential driven by said input member and having a first output driving a first driveline in a motor vehicle and a second output driving a second driveline in the motor vehicle, and wherein said clutch assembly is operably disposed between said first and second outputs of said interaxle differential.

20. A power transmission apparatus, comprising:
a rotary input member adapted to receive drive torque from a power source;
a rotary output member adapted to provide drive torque to an output device; and
a torque transfer mechanism operable for transferring drive torque from said input member to said output member, said torque transfer mechanism including a transfer clutch operably disposed between said input member and said output member, and a power-operated clutch actuator for controlling actuation of said transfer clutch, said transfer clutch configured to include a first clutch member fixed for rotation with said input member, a second clutch member fixed for rotation with said output member, and a multi-plate clutch pack operably disposed between said first and second clutch members, said power-operated clutch actuator configured to include an electric motor, a clutch apply operator, and a gear drive unit operably interconnecting said electric motor to said clutch apply operator, said clutch apply operator includes an axially moveable actuator plate configured to apply a clutch engagement force on said clutch pack, a sealed ballramp unit, and a thrust assembly disposed between said actuator plate and said sealed ballramp unit, said sealed ballramp unit including a stationary first cam plate, a rotatable and axially moveable second cam plate driven by said gear drive unit, balls disposed in a cavity formed between said first and second cam plates, and a sealing arrangement extending between said first and second cam plates for sealing said cavity so as to retain a lubricant therein, wherein said thrust assembly is disposed between said actuator plate and said second cam plate of said sealed ballramp unit, wherein said sealing arrangement includes a resilient first seal component extending between said first and second cam plates to delimit a first portion of said cavity and a resilient second seal component extending between said first and second cam plates to delimit a second portion of said cavity, and wherein said first and second seal components are elastic and accommodate both axial and rotational movement of said second cam plate relative to said first cam plate.

21. The power transmission apparatus of claim 20 wherein said first seal component is an inside bellows type seal having a first edge retained in a first groove formed in said first cam plate and a second edge retained in a second groove formed in said second cam plate, and wherein said second seal component is an outside bellows type seal having a first edge retained in said first groove formed in said first cam plate and a second edge retained in said second groove formed in said second cam plate.

22. A power transmission apparatus, comprising:
a rotary input member adapted to receive drive torque from a power source;
a rotary output member adapted to transmit drive torque to an output device; and
a torque transfer mechanism configured to transmit drive torque from said input member to said output member and including a transfer clutch and a power-operated clutch actuator, said transfer clutch including a multi-plate clutch pack operably disposed between said input and output members, said power-operated clutch actuator configured to generate and apply a clutch engagement force on said clutch pack for transmitting drive torque from said input member to said output member through said clutch pack, said power-operated clutch actuator including an electric motor, a clutch apply operator, and a gear drive unit operably connecting said electric motor to said clutch apply operator, said clutch apply operator including an axially moveable actuator plate configured to apply said clutch engagement force to said clutch pack, a sealed ballramp unit, and a thrust assembly disposed between said actuator plate and said sealed ballramp unit, said sealed ballramp unit including a stationary first cam plate, an axially moveable and rotatable second cam plate driven by said gear drive unit, balls disposed in a cavity defined between said first and second cam plates and which are operable to convert rotation of said second cam plate relative to said first cam plate into axial translation of said second cam plate and said actuator plate, and a sealing arrangement enclosing said gear drive unit and sealing said cavity so as to retain a lubricant therein, wherein said thrust assembly is disposed between said actuator plate and said second cam plate, and wherein said sealing arrangement includes a seal housing enclosing said gear drive unit, a resilient first seal component extending between said seal housing and said second cam plate, and a resilient second seal component extending between said first and second cam plates, said first and second seal components being elastic for respectively accommodating both axial and rotational movement of said second cam plate relative to said seal housing and relative to said first cam plate.

* * * * *